(12) United States Patent
Chen et al.

(10) Patent No.: US 12,600,369 B2
(45) Date of Patent: Apr. 14, 2026

(54) DRIVING ABILITY DETERMINING SYSTEM AND DRIVING ABILITY DETERMINING METHOD

(71) Applicant: PixArt Imaging Inc., Hsin-Chu City (TW)

(72) Inventors: Chao-An Chen, Hsin-Chu City (TW); Yu-Han Chen, Hsin-Chu City (TW); Chin-Hua Hu, Hsin-Chu City (TW)

(73) Assignee: PixArt Imaging Inc., Hsin-Chu City (TW)

( * ) Notice: Subject to any disclaimer, the term of this patent is extended or adjusted under 35 U.S.C. 154(b) by 50 days.

(21) Appl. No.: 18/732,651

(22) Filed: Jun. 4, 2024

(65) Prior Publication Data

US 2024/0317248 A1 Sep. 26, 2024

Related U.S. Application Data

(63) Continuation-in-part of application No. 17/857,194, filed on Jul. 5, 2022, now Pat. No. 12,195,073.

(51) Int. Cl.
| | |
|---|---|
| *B60W 50/06* | (2006.01) |
| *B60W 50/02* | (2012.01) |
| *B60W 50/10* | (2012.01) |
| *B60W 50/14* | (2020.01) |
| *B62D 1/04* | (2006.01) |

(52) U.S. Cl.
CPC ............ *B60W 50/06* (2013.01); *B60W 50/02* (2013.01); *B60W 50/10* (2013.01); *B60W 50/14* (2013.01); *B62D 1/046* (2013.01); *B60W 2540/30* (2013.01)

(58) Field of Classification Search
CPC ...... B60W 50/02; B60W 50/06; B60W 50/10; B60W 50/14; B60W 2540/30; B62D 1/046
USPC ............................................................ 701/36
See application file for complete search history.

(56) References Cited

U.S. PATENT DOCUMENTS

| | | | | |
|---|---|---|---|---|
| 12,043,268 | B2 * | 7/2024 | Fields | G08G 1/0129 |
| 12,086,583 | B2 * | 9/2024 | Fields | G05D 1/248 |
| 2010/0211270 | A1 * | 8/2010 | Chin | B62D 6/007 |
| | | | | 701/44 |
| 2017/0146801 | A1 * | 5/2017 | Stempora | G06Q 10/063 |
| 2023/0351893 | A1 * | 11/2023 | Bielby | G08G 1/04 |

FOREIGN PATENT DOCUMENTS

| | | | | |
|---|---|---|---|---|
| DE | 102012019625 A1 * | 4/2013 | | B62D 1/06 |

* cited by examiner

*Primary Examiner* — Andrew Joseph Rudy
(74) *Attorney, Agent, or Firm* — Winston Hsu

(57) ABSTRACT

A driving ability determining system, provided in a vehicle and for determining a driving ability of a driver of the vehicle, comprising: a HOD (Hand Off Detection) device embedded on a steering wheel, configured to receive at least one user input, wherein the user input is generated by the driver responding to a test instruction; and a processing circuit, configured to determine the driving ability of the driver according to the user input. By using such system, the driving ability may be determined in real time. Also, the driving function of the vehicle may be stopped if the driving ability is determined to be poor. By this way, the safety of driving vehicles may be increased.

18 Claims, 7 Drawing Sheets

Generate at least one test instruction responding to a trigger command by an instruction generating device — 701

Receive at least one user input by a HOD device embedded on a steering wheel, wherein the user input is generated by the driver responding to the test instruction — 703

Determine the driving ability of the driver according to the user input by a processing circuit — 705

DRIVING ABILITY DETERMINING SYSTEM AND DRIVING ABILITY DETERMINING METHOD

CROSS REFERENCE TO RELATED APPLICATIONS

This application is a continuation-in-part of U.S. Application Ser. No. 17/857,194, filed on Jul. 5, 2022. The content of the application is incorporated herein by reference.

BACKGROUND OF THE INVENTION

1. Field of the Invention

The present invention relates to a driving ability determining system and a driving ability determining method, and particularly relates to a driving ability determining system and a driving ability determining method which can determine a driving ability of a driver of a vehicle.

2. Description of the Prior Art

In modern society, vehicles play an important role in various situations, such as boats, airplanes or cars. During the transportation process, any accident of the vehicle may cause heavy losses of life and property. The physical condition or mental state of the driver is therefore very important. However, current vehicles cannot instantly determine the driver's physical condition or mental state, or cannot stop the driver to driving even if the driver is in a poor condition.

SUMMARY OF THE INVENTION

One objective of the present application is to provide a driving ability determining system which can determine a driving ability of a driver in real time.

Another objective of the present application is to provide driving ability determining method which can determine a driving ability of a driver in real time.

One embodiment of the present invention is to provide a driving ability determining system, provided in a vehicle and for determining a driving ability of a driver of the vehicle, comprising: a HOD (Hand Off Detection) device embedded on a steering wheel, configured to receive at least one user input, wherein the user input is generated by the driver responding to a test instruction; and a processing circuit, configured to determine the driving ability of the driver according to the user input.

Another embodiment of the present invention is to provide a driving ability determining method, for determining a driving ability of a driver of a vehicle, comprising: (a) generating at least one test instruction responding to a trigger command by an instruction generating device; (b) receiving at least one user input by a HOD device embedded on a steering wheel, wherein the user input is generated by the driver responding to the test instruction; and (c) determining the driving ability of the driver according to the user input by a processing circuit.

In view of above-mentioned embodiments, the driving ability may be determined in real time. Also, the driving function may be stopped if the driving ability is determined to be poor. By this way, the safety of driving vehicles may be increased.

These and other objectives of the present invention will no doubt become obvious to those of ordinary skill in the art after reading the following detailed description of the preferred embodiment that is illustrated in the various figures and drawings.

DETAILED DESCRIPTION

Several embodiments are provided in following descriptions to explain the concept of the present invention. The method in following descriptions can be performed by programs stored in a non-transitory computer readable recording medium by a processing circuit. The non-transitory computer readable recording medium can be, for example, a hard disk, an optical disc or a memory. Additionally, the term "first", "second", "third" in following descriptions are only for the purpose of distinguishing different one elements, and do not mean the sequence of the elements. For example, a first device and a second device only mean these devices can have the same structure but are different devices.

Figure 1:
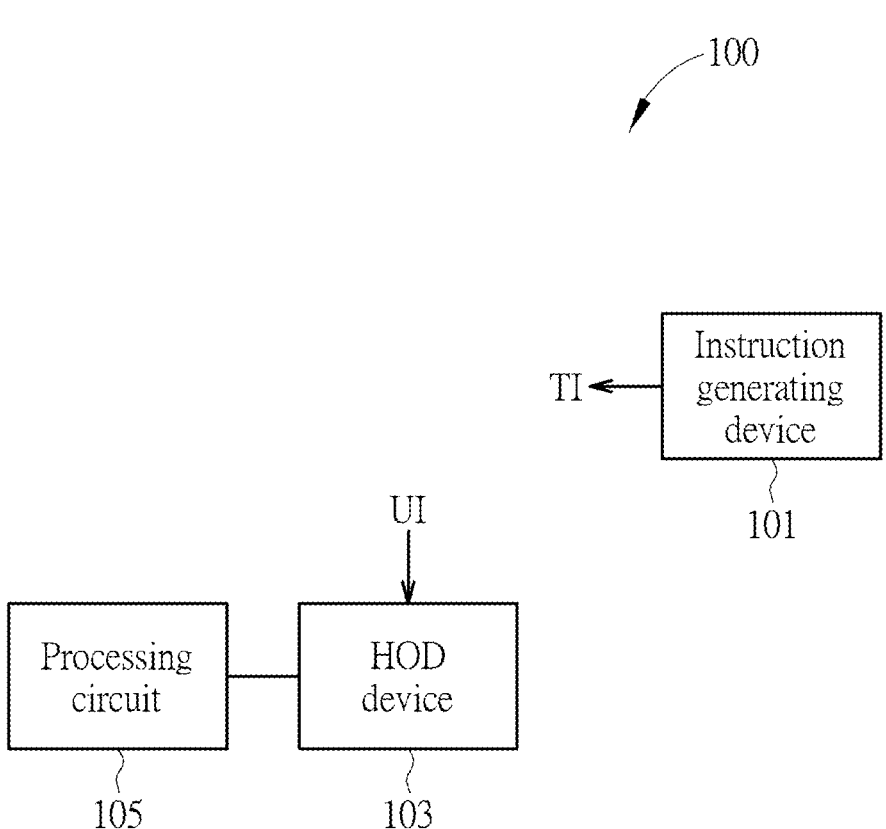
FIG. 1 is a block diagram illustrating a driving ability determining system, according to one embodiment of the present invention.

FIG. 1 is a block diagram illustrating a driving ability determining system 100, according to one embodiment of the present invention. The driving ability determining system 100 may be provided in a vehicle (e.g., a boat, an airplane or a car) and is for determining a driving ability of a driver of the vehicle. The driving ability may correspond to, for example, the physical condition or the mental state of the driver.

Figure 2:
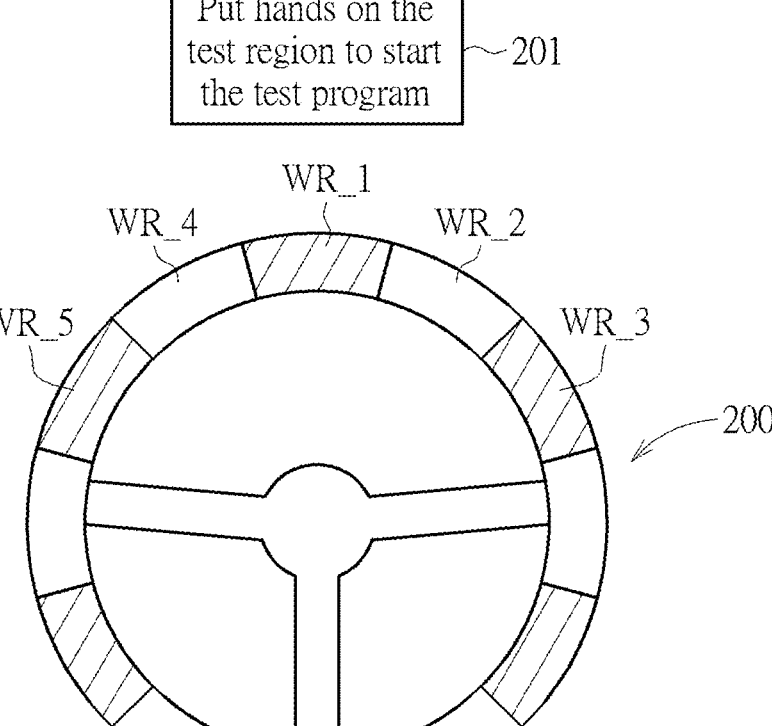
FIG. 2 is a schematic diagram illustrating the driving ability determining system embedded to a steering wheel, according to one embodiment of the present invention.

As shown in FIG. 1, the driving ability determining system 100 comprises an instruction generating device 101, a HOD device 103 and a processing circuit 105. The instruction generating device 101 is configured to generate at least one test instruction TI. The HOD device 103 is configured to receive at least one user input UI, wherein the user input UI is generated by the driver responding to the test instruction TI. The user input UI may be a touch event, a pressure event or a gesture such as a tap or a swipe. The processing circuit 105 is configured to determine the driving ability of the driver according to the user input UI. The driving ability determining system 100 may be implemented by a steering wheel. FIG. 2 is a schematic diagram illustrating the driving ability determining system 100 embedded to a steering wheel 200, according to one embodiment of the present invention. In such embodiment, the steering wheel

200 is the above-mentioned HOD device 103. In such embodiment, the vehicle comprising the steering wheel 200 may further comprises a display 201 for displaying the test instruction TI. In such case, the instruction generating device 101 may be a computer and the test instruction TI may be a text instruction as shown in FIG. 2. However, the instruction generating device 101 may be any kind of electronic device, and the test instruction may also be a sound instruction or a light pattern. The instruction generating device 101 may be independent from the driving ability determining system 100. For example, the driving ability determining system 100 which comprises the HOD device 103 and the processing circuit 105 is provided in a vehicle, and the instruction generating device 101 is implemented by a mobile phone of the user, which can communicate with the driving ability determining system 100.

Further, in the embodiment of FIG. 2, the steering wheel 200 comprises a plurality of regions. Only five of the regions WR_1, WR_2, WR_3, WR_4 and WR_5 are symbolized for explaining. Some of the regions may be used as test regions. For example, in FIG. 2, the regions WR_1, WR_3, and WR_5 are test regions. The driver may touch or hold the test regions following the test instruction TI in FIG. 2 for testing. In another embodiment, all regions of the steering wheel 200 may be used as test regions.

In the embodiment of FIG. 2, the test instruction is an instruction related with a test program. For example, as shown in FIG. 2, the display 201 shows "put hands on the test region to start the test program" to inform the driver to execute the test program. The locations of the test regions may be pre-marked on the steering wheel 200 or shown on the display 201. In one embodiment, at least one light source is provided to the test regions to mark the test regions. The user input UI causes at least one corresponding action contained in the test program.

Figure 3:
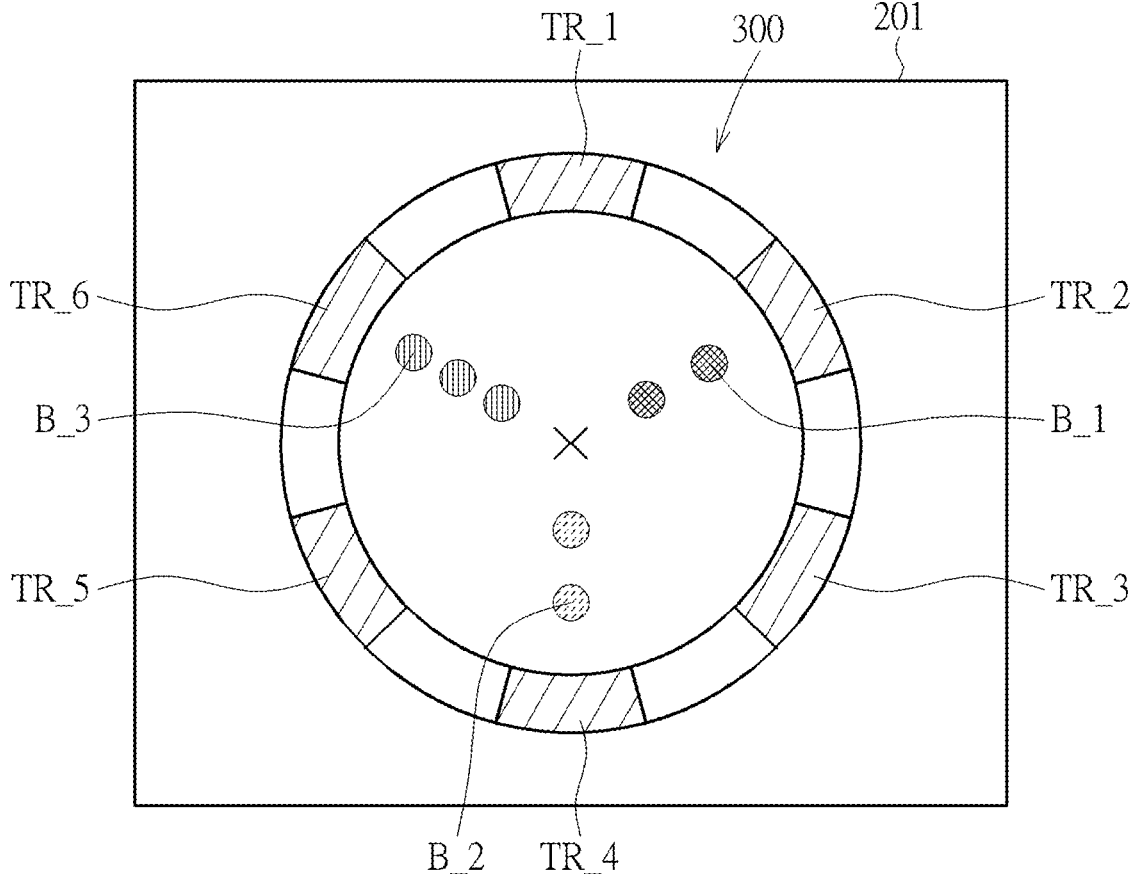
FIG. 3 is a schematic diagram illustrating a screen of the test program according to one embodiment of the present invention.

FIG. 3 is a schematic diagram illustrating a screen of the test program according to one embodiment of the present invention. In the embodiment of FIG. 3, the test program is a game program, and game screens generated by the game program are shown on the display 201 after the game program is executed. As shown in FIG. 3, the ring 300 corresponding to the steering wheel 200 has different regions TR_1 . . . TR_6. Regions TR_1 . . . TR_6 may correspond to the aforementioned test regions in FIG. 2. Balls with different colors or sizes (only balls B_1, B_2, B_3 are symbolized for explaining) can be respectively shot from the regions TR_1 . . . TR_6 at different speeds to the center of the ring 300 (the point labeled X).

When the ball reaches the center of the ring 300, the driver must hold the region of the steering wheel corresponding to the region where the ball was shot. For example, the ball B_1 is shot from the region TR_2, and the region of steering wheel 200 corresponding to the region TR_2 is the region WR_3. Therefore, when the ball B_1 reaches the center, the driver must hold the region WR_3. The more accurate the holding time, the higher the score the driver can get. Also, the scores for balls with different sizes or colors may be different. In such example, the user input UI is a pressure event and the corresponding action is "getting scores". After the test is accomplished, the processing circuit 105 determines the driving ability according to scores caused by the corresponding action. For example, if the score is above a score threshold, the processing circuit 105 determines that the driver has a good driving ability. On the contrary, if the score is below the score threshold, the processing circuit 105 determines that the driver has a poor driving ability.

In one embodiment, the test is performed before the driver starts to drive the vehicle. In such case, the processing circuit 105 may activates or deactivates a driving function of the vehicle according to the determined driving ability. For example, if the processing circuit 105 determines that the driver has a poor driving ability, the processing circuit 105 deactivates the driving function (i.e., the driver could not drive the vehicle). On the contrary, if the processing circuit 105 determines that the driver has a good driving ability, the processing circuit 105 activates the driving function (i.e., the driver can drive the vehicle).

The above-mentioned regions of the steering wheel 200 may have various structures. In one embodiment, the regions may have touch sensing function. In such case, the HOD device 103 regards touches on two different regions of the HOD device 103 as two different ones of the user input. For example, in the embodiment of FIG. 2, the touches respectively on the regions WR_1, WR_2 may be regarded as different touches. In another embodiment, the regions may have pressure sensing function. In such case, the HOD device 103 regards forces on two different regions of the HOD device 103 as two different ones of the user input.

Figure 4:
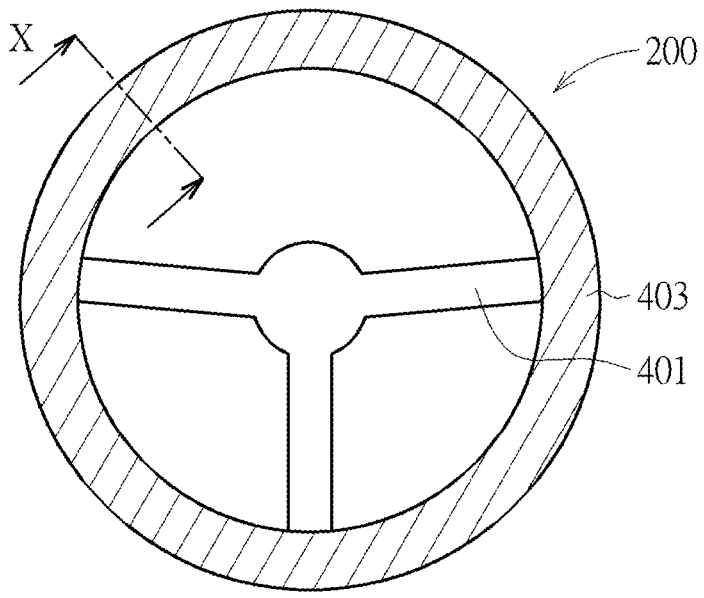
FIG. 4 is a schematic diagram illustrating a steering wheel with functions of the touch sensing and the pressure sensing, according to one embodiment of the present invention.
Figure 4:
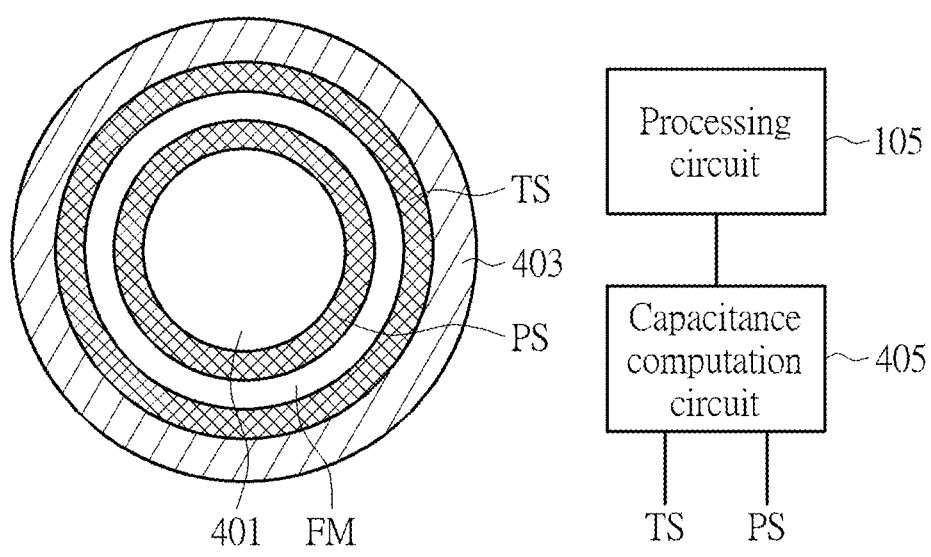

In one embodiment, the steering wheel 200 has both functions of the touch sensing and the pressure sensing. FIG. 4 is a schematic diagram illustrating a steering wheel with functions of the touch sensing and the pressure sensing, according to one embodiment of the present invention. The lower diagram in FIG. 4 is a cross sectional view following an X direction of the upper diagram in FIG. 4. As illustrated in the upper diagram of FIG. 4, the steering wheel 200 comprises a frame work 401 and a covering material 403. The covering material 403, which can be leather or plastic, is the outermost layer of the steering wheel 200.

As shown in the lower diagram of FIG. 4, besides the frame work 401 and the covering material 403, the steering wheel 200 further comprises a capacitive touch sensor layer TS, a capacitive pressure sensor layer PS and a flexible material layer FM. The capacitive pressure sensor layer PS is surrounding the frame work 401, and is configured to generate a pressure sensing signal. The flexible material layer FM such as polyurethane or any other flexible material, is located between the capacitive pressure sensor layer PS and the capacitive touch sensor layer TS, and surrounding the capacitive pressure sensor layer PS. In other words, the capacitive touch sensor layer TS is above the flexible material layer FM when the capacitive pressure sensor layer PS is below the flexible material layer FM. The capacitive touch sensor layer TS is configured to generate a touch sensing signal.

The steering wheel 200 further comprises a capacitance computation circuit 405 and the processing circuit 105. In such case, the processing circuit 105 can be a processor of the vehicle using the steering wheel 200, and the capacitance computation circuit 405 can be integrated to the processing circuit 105. Also, the capacitive touch sensor layer TS has at least one first driving electrode and at least one first sensing electrode. Besides, the capacitive pressure sensor layer PS has at least one second driving electrode and at least one second sensing electrode. The capacitance computation circuit 405 generates driving signals to the first driving electrode of the capacitive touch sensor layer TS and senses capacitance information from/through the first sensing electrode (i.e., the touch sensing signal). Similarly, the capacitance computation circuit 405 generates driving signals to the second driving electrode of the capacitive pressure sensor layer PS and senses capacitance information from/ through the second sensing electrode (i.e., the pressure sensing signal).

In one embodiment, the first driving electrode and the first sensing electrode are coupled to a first predetermined volt- age level when the capacitive pressure sensor layer PS performs a sensing operation. The sensing operation means the capacitance computation circuit 405 transmits driving signals to the second driving electrode of the capacitive pressure sensor layer PS, and senses capacitance informa- tion from/through the second sensing electrode. Following the same rule, the second driving electrode and the second sensing electrode are coupled to a second predetermined voltage level when the capacitive touch sensor layer TS performs a sensing operation. The sensing operation means the capacitance computation circuit 405 transmits driving signals to the first driving electrode of the capacitive touch sensor layer TS, and senses capacitance information from/ through the first sensing electrode. The first predetermined voltage level and the second predetermined voltage level can be identical, but can be different as well. In one embodiment, the first predetermined voltage level and the second prede- termined voltage level are both at a ground level, which is used for the whole vehicle.

Briefly, when the capacitance computation circuit 405 senses the capacitance of the capacitive touch sensor layer TS, the capacitive pressure sensor layer PS is coupled to a predetermined voltage level such as a ground to operate as an active shielding layer. The active shielding layer can prevent a layer which is performing sensing operations from being interfered by another layer or another circuit. Follow- ing the same rule, when the capacitance computation circuit 405 senses the capacitance of the capacitive pressure sensor layer PS, the capacitive touch sensor layer TS is coupled to a predetermined voltage level such as a ground to operate as an active shielding layer.

The capacitance of the first sensing electrode of the capacitive touch sensor layer TS changes if the driver touches the steering wheel 200. Also, the capacitance of the second sensing electrode of the capacitive pressure sensor layer PS changes if the driver presses (or clench) the steering wheel 200. For more details, in one embodiment, if the driver's hand is away from the steering wheel for a long distance, the driver's hand does not cause variation to the capacitance of the second sensing electrode of the capacitive pressure sensor layer PS. If a driver presses or clenches the steering wheel 200, a distance between the driver's hand and the capacitive pressure sensor layer PS changes, thus the capacitive pressure sensor layer PS may respond to the existence of the hand. After that, since the capacitive touch sensor layer TS has a specific voltage level (e.g., the above-mentioned second predetermined voltage level) and a distance between the capacitive touch sensor layer TS and the capacitive pressure sensor layer PS changes due to the flexible material layer FM which exists between the capaci- tive touch sensor layer TS and the capacitive pressure sensor layer PS, the capacitance of the capacitive pressure sensor layer PS changes.

The contents disclosed by FIG. 4 are also disclosed in U.S. Application Ser. No. 17/857,194, which is incorporated herein by reference. Other details and variations of the steering wheel 200 with both functions of the touch sensing and the pressure sensing are also disclosed in U.S. Appli- cation Ser. No. 17/857,194, thus are omitted here for brevity.

Figure 5:
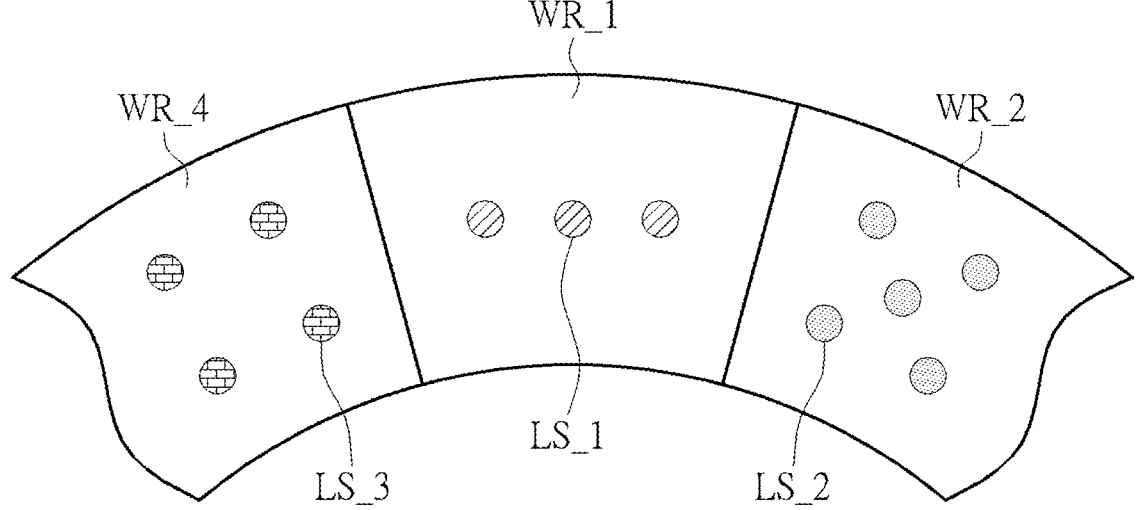
FIG. 5 is a schematic diagram illustrating detail structures of regions of the steering wheel according to another embodiment of the present invention.

Besides the touch sensing and pressure sensing, the region of the steering wheel 200 may comprise other structures. FIG. 5 is a schematic diagram illustrating detail structures of regions of the steering wheel according to another embodi- ment of the present invention. In the embodiment of FIG. 5, the regions of the steering wheel 200 have the function of light sensing, and respectively comprise different numbers of light sources having different light wave lengths. For example, the region WR_1 comprises three light sources LS_1 which emit light with first light wavelengths, the region WR_2 comprises five light sources LS_2 which emit light with second light wavelengths, and the region WR_3 comprises five light sources LS_3 which emit light with third light wavelengths. Only one light source LS_1, only one light source LS_2, and only one light source LS_3 are symbolized for explaining.

In the embodiment of FIG. 5, the regions WR_1, WR_2 and WR_4 may respectively comprise an optical sensor for sensing reflecting light. Accordingly, if the driver's hand touches or approaches the regions WR_1, WR_2 or WR_4, the optical sensors may receive reflected light with a strong light intensity. By this way, the driver may provide user input (touch or approaching) to the steering wheel 200. In such case, the user inputs provided to different regions WR_1, WR_2 or WR_4 are regarded as different user inputs. As above-mentioned, at least one light source may be provided to the test regions to mark the test regions. Accord- ingly, in one embodiment, the light sources LS_1, LS_2, LS_3 shown in FIG. 5 are used to mark the regions WR_1, WR_2 and WR_4, and the regions WR_1, WR_2 and WR_4 do not comprise optical sensors in such case. In such embodiment, the regions WR_1, WR_2 and WR_4 may still have the above-mentioned touch sensing function.

Figure 6:
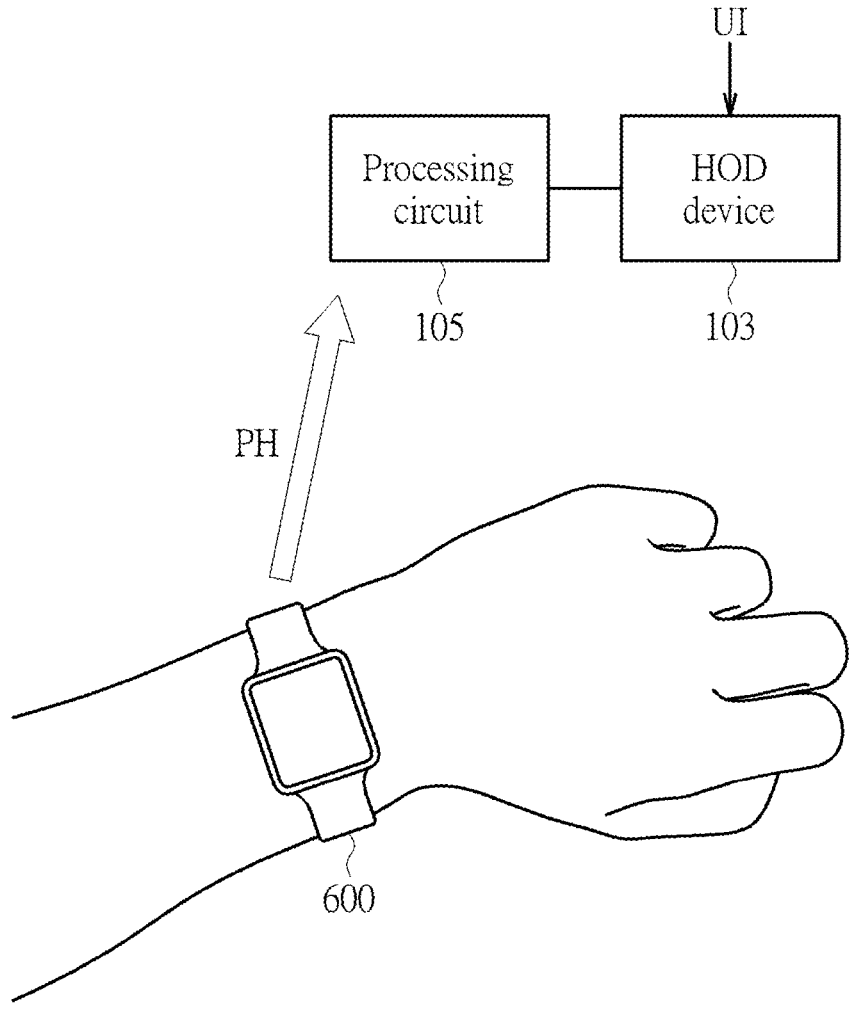
FIG. 6 is a schematic diagram illustrating determining the driving ability according to a physiological parameter of the driver.

The driving ability may further be determined by infor- mation from other devices rather than limited to the user input responding to the test instruction. FIG. 6 is a schematic diagram illustrating determining according to a physiologi- cal parameter of the driver. In the embodiment of FIG. 6, the physiological parameter of the driver, such as blood pres- sure, heartbeat, pulse, is detected by a wearable device worn by the driver, such as a smart watch 600 shown in FIG. 6.

In such case, the physiological parameter is transmitted to the processing circuit 105, and the processing circuit 105 determines the driving ability according to the above-men- tioned user input UI and the physiological parameter. For example, if the score of the test program shown in FIG. 3 is lower than the score threshold but the physiological param- eter of the driver is normal, the processing circuit 103 may still determine the driver has a good driving ability. On the contrary, if the score of the test program shown in FIG. 3 is higher than the score threshold but the physiological param- eter of the driver is poor, the processing circuit 103 may still determine the driver has a poor driving ability. Any variation based on these examples should also fall in the scope of the present application.

Figure 7:
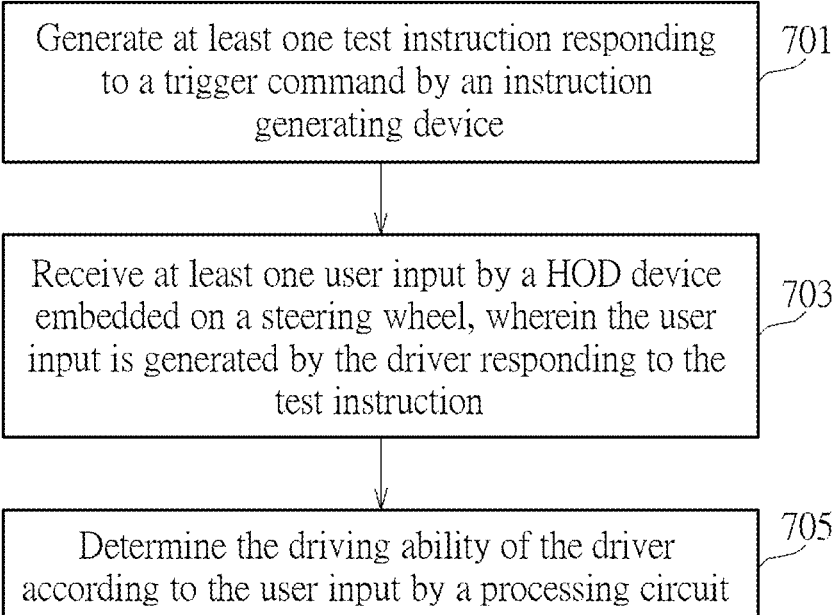
FIG. 7 is a flow chart illustrating a driving ability determining method according to one embodiment of the present invention.

In view of above-mentioned descriptions, a driving ability determining method may be acquired. FIG. 7 is a flow chart illustrating a driving ability determining method according to one embodiment of the present invention. FIG. 7 com- prises following steps:

Step 701

Generate at least one test instruction responding to a trigger command by an instruction generating device (e.g., the instruction generating device in FIG. 1).

Step 703

Receive at least one user input by a HOD device (e.g., the HOD device 103 in FIG. 1) embedded on a steering wheel, wherein the user input is generated by the driver responding to the test instruction

7

Step 705

Determine the driving ability of the driver according to the user input by a processing circuit (e.g., the processing circuit 105 in FIG. 1).

In view of above-mentioned embodiments, the driving ability may be determined in real time. Also, the driving function of the vehicle may be stopped if the driving ability is determined to be poor. By this way, the safety of driving vehicles may be increased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A driving ability determining system, provided in a vehicle and for determining a driving ability of a driver of the vehicle, comprising:

a HOD (Hand Off Detection) device embedded on a steering wheel, configured to receive at least one user input responding to at least one instruction provided by a test program, wherein the instruction informs the driver to perform at least one specific user input to the steering wheel; and a processing circuit, configured to determine the driving ability according to whether the user input follows the specific user input or not.

2. The driving ability determining system of claim 1, wherein the HOD device regards touches on two different regions of the HOD device as two different ones of the user input.

3. The driving ability determining system of claim 1, wherein the HOD device further receives a test instruction, wherein the test instruction is a sound instruction, a light pattern instruction, or a text instruction, wherein the test instruction is related with the test program, and the user input causes at least one corresponding action contained in the test program.

4. The driving ability determining system of claim 1, wherein the user input is a touch event, a pressure event or a gesture.

5. The driving ability determining system of claim 4, wherein the processing circuit determines the driving ability according to scores caused by the corresponding action.

6. The driving ability determining system of claim 1, wherein the processing circuit further determines the driving ability according to a physiological parameter of the driver.

7. The driving ability determining system of claim 6, wherein the physiological parameter is generated by a wearable device worn by the driver.

8. The driving ability determining system of claim 1, wherein the processing circuit further activates or deactivates a driving function of the vehicle according to the driving ability determined by the processing circuit.

9. The driving ability determining system of claim 1, wherein the steering wheel comprises a plurality of regions comprising different numbers of light sources having different light wave lengths, wherein the HOD device receives different ones of the user inputs at different ones of the regions.

10. A driving ability determining method, for determining a driving ability of a driver of a vehicle, comprising:

(a) generating at least one test instruction responding to a trigger command by an instruction generating device;

(b) receiving at least one user input responding to at least one instruction provided by a test program by a HOD device embedded on a steering wheel, wherein the instruction informs the driver to perform at least one specific user input to the steering wheel; and (c) determining the driving ability according to whether the user input follows the specific user input or not.

11. The driving ability determining method of claim 10, wherein the step (b) comprises:

regarding touches on two different regions of the HOD device as two different ones of the user input by the HOD device.

12. The driving ability determining method of claim 10, further comprising:

receiving a test instruction;

wherein the test instruction is a sound instruction, a light pattern instruction, or a text instruction, wherein the test instruction is related with the test program, and the user input causes at least one corresponding action contained in the test program.

13. The driving ability determining method of claim 10, wherein the user input is a touch event, a pressure event or a gesture.

14. The driving ability determining method of claim 13, wherein the step (c) determines the driving ability according to scores caused by the corresponding action.

15. The driving ability determining method of claim 10, wherein the step (c) further determines the driving ability according to a physiological parameter of the driver.

16. The driving ability determining method of claim 15, wherein the physiological parameter is generated by a wearable device worn by the driver.

17. The driving ability determining method of claim 10, further comprising:

activating or deactivating a driving function of the vehicle according to the driving ability by the processing circuit.

18. The driving ability determining method of claim 10, wherein the steering wheel comprises a plurality of regions comprising different numbers of light sources having different light wave lengths, wherein the driving ability determining method further comprises: receiving different ones of the user inputs at different ones of the regions.

* * * * *